United States Patent Office 3,277,214
Patented Oct. 4, 1966

---

3,277,214
S-(2-AMIDOCARBOXY-PHENYL) ESTERS OF PHOSPHORUS ACIDS
Walter Lorenz, Wuppertal-Vohwinkel, Germany, assignor to Farbenfabriken Bayer Aktiengesellschaft, Leverkusen, Germany, a German corporation
No Drawing. Filed June 13, 1963, Ser. No. 287,518
Claims priority, application Germany, June 14, 1962,
F 37,067
12 Claims. (Cl. 260—943)

The present invention relates to and has as its objects novel and useful phosphorus containing insecticidally active compounds.

More specifically this invention is concerned with dialkyl-thiol- or -thionothiol-phosphoric (-phosphonic, -phosphinic) acid-S-(2-amidocarboxy-phenyl) esters of the general formula

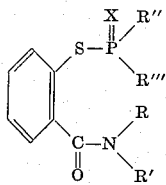

as well as processes for their production.

In the above formula R and R' denote hydrogen atoms or alkyl radicals, R" and R'" stand for preferably lower alkyl or alkoxy groups, whilst Y represents a hydrogen or halogen atom, a nitro or lower alkyl group, and X is oxygen or sulphur.

O,O-diethyl-thiol- or -thionothio-phosphoric acid-S-(2-carbalkoxy-phenyl) esters, i.e. phosphorylated derivatives of thiosalicylic acid esters, are already known from German patent specifications Nos. 817,057 and 885,176.

As stated in the said patent specifications, these compounds are very suitable for combating sucking and eating insect pests.

In accordance with the present invention is has now been found that the corresponding dialkylthiol- or -thionothiol-phosphoric (-phosphonic, -phosphinic) acid-S-(2-amido-carboxy-phenyl) esters of the above formula i.e. phosphoric (phosphonic, phosphinic) acid derivatives of optionally N-substituted thiosalicylic acid amides, which are not yet described in the literature also possess excellent insecticidal properties and are therefore eminently suitable as pest control agents.

The production of the compounds according to the invention is carried out by reacting the corresponding 2-amido- or 2-N-alkylamido- or 2-N,N-dialkylamido-carboxy-phenyl-sulphenic acid halides with O,O-dialkyl-(thiol)phosphorous or alkyl-(thiol)phosphonous acid-O-alkyl esters or dialkyl-(thiol)phosphinous acids.

However, it is also possible to use 2-halo-carboxyphenyl-sulphenic acid halides as starting materials and to react these first with the said (thiol)phosphorous (-phosphonous) acid esters or (thiol)phosphinous acids and subsequently, expediently without isolating the intermediate products, with ammonia, N-alkyl- or N,N-dialkylamines.

The course of the reaction according to the present process may be illustrated in more detail by the following reaction scheme:

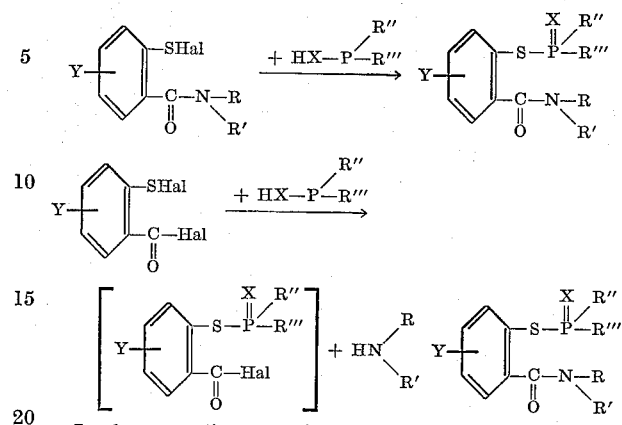

In the preceding equations, the symbols R to R'", X and Y have the same significance as given above, whilst Hal stands for a halogen atom.

The reaction according to the invention is preferably carried out in the presence of inert organic solvents. Chlorinated aliphatic hydrocarbons such as methylene chloride, chloroform or carbon tetrachloride have proved to be especially suitable.

The 2-halo- or optionally N-substituted 2-amido carboxy-phenyl-sulphenic acid halides required as starting materials for the inventive process are produced by splitting the corresponding bis-(2-halo- or 2-amido-, 2-N-alkylamido- or 2-N,N-dialkylamido-carboxy-phenyl)-disulphides with halogenating agents such as elementary chlorine or bromine or with sulphuryl chloride. It is not necessary to isolate the sulphenic acid halides in substance; the reaction products of the above-mentioned bis-(2-halo- or 2-amido-carboxy-phenyl)-disulphides and the halogenating agents can directly be reacted according to the present invention with the dialkyl(thiol)-phosphorous (-phophonous, -phosphinous) acid derivatives or, without isolation of the intermediate products, subsequently reacted with ammonia, N-alkyl- or N,N-dialkylamines, if desired.

The compounds obtainable according to the process of the invention are in part obtained in crystalline form, but some are colourless to slightly coloured oils which cannot be distilled without decomposition even in a vacuum.

As already mentioned above, the products of the present invention are distinguished by an outstanding action against a number of insect pests.

The new compounds very effectively kill insects like aphids, spider mites, ticks, blowfly larvae, caterpillars, flies etc. They distinguish themselves especially by a good contact-insecticidal activity in part also by an ovicidal effect and mostly also by an outstanding systemic action. At the same time they have an activity on eating insects such as caterpillars. Most surprisingly they are of remarkably low toxicity against warm-blooded creatures. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As examples for the special utility the inventive compounds of the following formulae I 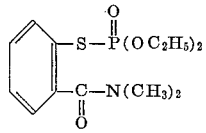

II 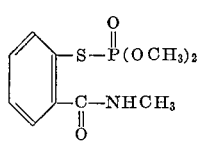

III 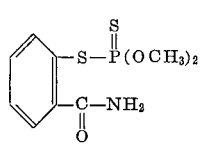

have been tested against aphids and spider mites. Aqueous dilutions of these compounds have been prepared by mixing the active ingredients with the same amounts of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at last with water to the desired concentration indicated in the following paragraphs. The tests have been carried out as follows:

(a) Against aphids (species *Doralis fabae*): heavily infested bean plants (*Vicia faba*) have been sprayed drip wet with solutions as prepared above. The effect has been determined after 24 hours by counting the dead pests either on the surface of the soil or still remaining on the plants. The following results have been obtained:

| Compound | Aqueous concentration (in percent active ingredient/water) | Killing rate (in percent) |
|---|---|---|
| I | 0.001 | 100 |
| II | 0.001 | 100 |
| III | 0.01 | 100 |

(b) Against spider mites: Bean plants (*Phaseolus vulgaris*) of about 15 inches height are sprayed drip wet with solutions as prepared above and in a concentration as shown below. The bean plants have been infested heavily with the two-spotted spider (species *Tetranychus telarius*). Evaluation has been carried out after 24 hours, 48 hours and 8 days. The following results have been obtained:

| Compound | Aqueous concentration (in percent active ingredient/water) | Killing rate (in percent) |
|---|---|---|
| I | 0.001 | [1]100 |
| II | 0.001 | [1]100 |
| III | 0.1 | 100 |

[1] Ovicidal action.

Regarding the insecticidal properties the inventive products are clearly superior to the compounds of analogous composition known from German patent specifications Nos. 817,057 and 885,176. This unexpected and technically valuable superiority of the thio- or dithiophosphoric (-phosphonic, -phosphinic) acid esters according to the invention can be seen from the following table:

| Compound | Administration against | Insecticidal activity | |
|---|---|---|---|
| | | Aqueous concentration (in percent active ingredient/water) | Killing rate (in percent) |
| phenyl with S—P(O)(OC₂H₅)₂ and COOC₂H₅ (Known from German Patent No. 817,057). | Aphids (contact action). Spider mites. Aphids (systemic action). | 0.01<br>0.01<br>0.1 | 50<br>0<br>0 |
| phenyl with S—P(O)(OC₂H₅)₂ and CONHCH₃ (According to the invention). | Aphids (contact action). Spider mites. Aphids (systemic action). | { 0.01<br>0.001<br>0.001<br>0.1 | 100<br>60<br>100<br>100 |
| phenyl with S—P(S)(OC₂H₅)₂ and COOCH₃ (Known from German Patent No. 885,176.) | Aphids (contact action). Spider mites. Aphids (systemic action). | 0.05 | 100 |
| phenyl with S—P(S)(OC₂H₅)₂ and CONHCH₃ (According to the invention). | Aphids (contact action). Spider mites. Aphids (systemic action). | { 0.01<br>0.001<br>0.001<br>0.001<br>0.1 | 100<br>60<br>100<br>90<br>100 |

On account of their excellent insecticidal properties the compounds obtainable according to the invention are used as pest control agents, chiefly for plant protection and in the veterinary field.

The following examples are given for the purpose of illustrating the invention as claimed.

*Example 1*

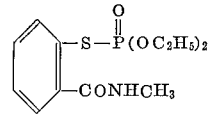

100 g. (0.3 mol) of bis-(2-N-methylamidocarboxyphenyl)-disulphide (prepared according to A. Reissert and E. Manns in "Berichte der deutschen chemischen Gesellschaft," vol. 61 (1928), page 1312; M.P. 216.5° C.) are suspended in 700 cc. of chloroform. To this suspension 45 g. (0.33 mol) of sulphuryl chloride are added dropwise at 20 to 25° C. with stirring and external cooling, the mixture is subsequently stirred at room temperature for a further 10 minutes and then treated dropwise with 92 g. (0.66 mol) of O,O-diethylphosphorous acid ester. A strong exothermic reaction occurs. An internal temperature of 20 to 30° C. is maintained by cooling the reaction mixture with icewater. After stirring the mixture for one hour, the solvent is distilled off and the distillation residue stirred with water. The separated oil is taken up in benzene and the benzene solution briefly washed with a sodium bicarbonate solution. The organic phase is finally dried over sodium sulphate, the solvent distilled off, and as residue there are obtained 122 g. (57% of the theoretical yield) of the O,O-diethyl-thiolphosphoric acid-S-(2-N-methylamidocarboxy-phenyl) ester in the form of a thickly liquid, yellow-orange coloured oil which cannot be distilled even in a high vacuum.

*Analysis.*—Calculated for $C_{12}H_{18}O_4NSP$ (mol. weight 303.3): N, 4.62%; S, 10.57%; P, 10.21%. Found: N, 4.60%; S, 10.64%; P, 10.09%.

Aphids are completely destroyed by 0.01% solutions and spider mites even by 0.001% solutions of the compound. Moreover the product shows an ovicidal activity against the eggs of spider mites.

*Example 2*

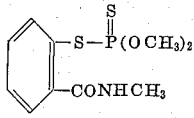

37 g. (0.275 mol) of sulphuryl chloride are added dropwise with stirring and external cooling to a suspension of 83 g. (0.25 mol) of bis-(2-N-methylamidocarboxy-phenyl)-disulphide in 700 cc. of chloroform, the mixture is further stirred for 10 minutes, treated dropwise with 69 g. (0.55 mol) of O,O-dimethyl-thiolphosphorous acid ester, and subsequently stirred for a further 2½ hours at 20 to 25° C., until the solid components are dissolved. The reaction mixture is then stirred with water, the organic phase separated and washed with a potassium carbonate solution until the reaction is neutral. After distilling off the solvent, the O,O-dimethyl-thionothiolphosphoric acid-S-(2-N-methylamidocarboxy-phenyl) ester remains in the form of an oil which solidifies in a crystalline form upon trituration with petroleum ether. After recrystallisation from a mixture of equal parts of acetic acid ethyl ester and petroleum ether, the compound is obtained as almost colourless small needles of M.P. 112 to 113° C. The yield amounts to 105 g. (56.7% of the theoretical).

*Analysis.*—Calculated for $C_{10}H_{14}O_3NS_2P$ (mol. weight 291.3): N, 4.81%; P, 10.64%. Found: N, 4.94%; P, 10.98%.

Aphids and spider mites are killed 100% by 0.01% solutions of the ester. The compound also exhibits an ovicidal activity against the eggs of spider mites.

*Example 3*

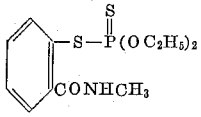

83 g. (0.25 mol) of bis-(2-N-methylamidocarboxy-phenyl)-disulphide are suspended in 700 cc. of chloroform, 37 g. (0.275 mol) of sulphuryl chloride (22.3 cc.) are added dropwise with stirring to this suspension at 20 to 25° C., while cooling, the mixture is stirred for a further 10 minutes and subsequently mixed dropwise with 85 g. (0.55 mol) of O,O-diethyl-thiolphosphorous acid ester. The temperature of the reaction mixture rises to 34 to 35° C. in the course of 2 hours whereby all solid constituents are dissolved. After distilling off the solvent, the residue solidifies in crystalline form. The O,O-diethyl-thiono-thiolphosphoric acid-S-(2-N-methyl-amidocarboxy-phenyl) ester can be recrystallised from an ether/petroleum ether mixture and then melts at 76 to 78° C. The yield amounts to 122 g. (76.4% of the theoretical).

*Analysis.*—Calculated for $C_{12}H_{18}O_3NS_2P$ (mol. weight 319.4): N, 4.39%; S, 20.08%; P, 9.70%. Found: N, 4.42%; S, 20.41%; P, 9.72%.

On rats per os the mean toxicity of the compound ($DL_{50}$) amounts to 5 mg. per kg. of animal.

Aphids and spider mites are completely destroyed by 0.01% solutions of the compound, which moreover shows an ovicidal activity against the eggs of spider mites.

*Example 4*

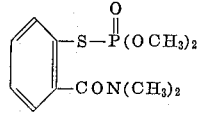

A solution of 36 g. (0.1 mol) of bis-(2-N,N-dimethylamidocarboxy-phenyl)-disulphide (M.P. 132° C.) in 150 cc. of methylene chloride is treated dropwise at 20° C. with 15 g. (0.11 mol) of sulphuryl chloride. A weak exothermic reaction occurs. The temperature of the mixture is maintained at 20 to 25° C. by appropriate external cooling. 10 minutes after the reaction is completed, 27.5 g. (0.25 mol) of O,O-dimethyl-phosphorous acid ester are added dropwise to the reaction mixture, the solvent is distilled off after a further 10 minutes, the residue is stirred with water and the separated oil taken up in methylene chloride. The methylene chloride solution is washed with water until the reaction is neutral, the organic phase is then dried over sodium sulphate and the solvent again distilled off. The residue solidifies in crystalline form. After recrystallisation from acetic acid ethyl ester, the O,O-dimethyl-thiolphosphoric acid-S-(2-N,N-dimethylamidocarboxy-phenyl) ester is obtained in the form of coarse, colourless crystals of M.P. 76° C. The yield amounts to 45 g. (78% of the theoretical).

*Analysis.*—Calculated for $C_{11}H_{16}O_3NSP$ (mol. weight 289.3): N, 4.84%; S, 11.08%; P, 10.71%. Found: N, 4.64%; S, 11.42%; P, 10.57%.

On rats per os the acute toxicity of the compound ($DL_{95}$) amounts to 25 mg. per kg. of animal.

Spider mites are destroyed 100% by 0.001% solutions, aphids by 0.01% solutions of the ester. The compound also shows an ovicidal action against the eggs of spider mites.

*Example 5*

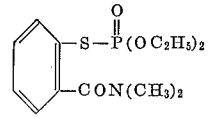

36 g. (0.1 mol) of bis-(2-N,N-dimethylamidocarboxy-phenyl)-disulphide are dissolved in 150 cc. of methylene chloride. 15 g. (0.11 mol) of sulphuryl chloride are added dropwise to this solution at 20° C. whereby a weak exothermic reaction occurs. The temperature of the mixture is maintained at 20 to 25° C. by appropriate external cooling. 10 minutes after the reaction is completed, the reaction mixture is treated with 35 g. (0.25 mol) of O,O-diethyl-phosphorous acid ester, the solvent distilled off after a further 10 minutes, the residue stirred with water and the separated oil taken up in methylene chloride. The methylene chloride solution is washed with water until it reacts neutrally, dried over sodium sulphate, and the solvent is finally again distilled off. 54 g. (87.5% of the theoretical yield) of O,O-diethyl-thiolphosphoric acid - S - (2 - N,N - dimethylamido - carboxy-phenyl) ester are obtained as a thickly liquid, yellow-green oil which is not distillable.

*Analysis.*—Calculated for $C_{13}H_{20}O_4NSP$ (mol weight 317.3): N, 4.42%; S, 10.10%; P, 9.76%. Found: N, 4.41%; S, 10.06%; P, 9.84%.

On rats per os the acute toxicity of the compound ($DL_{95}$) amounts to 2.5 mg. per kg. of animal.

Aphids and spider mites are completely destroyed by 0.001% solutions of the compound. The product also possesses an ovicidal action against the eggs of spider mites.

Example 6

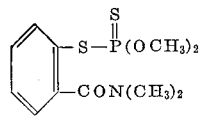

15 g. (0.11 mol) of sulphuryl chloride are added dropwise at 20° C. to a solution of 36 g. (0.1 mol) of bis-(2 - N,N - dimethylamidocarboxy - phenyl) - disulphide in 150 cc. of methylene chloride. A weak exothermic reaction occurs. The temperature of the mixture is maintained at 20 to 25° C. by appropriate external cooling. 10 minutes after the addition is completed 28 g. (0.22 mol) of O,O-dimethyl-thiolphosphorous acid ester are added dropwise with stirring to the reaction mixture, the latter is stirred for a further 10 minutes and then washed with water and a sodium bicarbonate solution until it reacts neutrally. After drying the organic phase over sodium sulphate, the solvent is distilled off. The distillation residue solidifies in crystalline form. It is recrystallised from ether (solubility about 1 g./2 cc.), whereupon the O,O-dimethyl-thionothiol-S-(2-N,N-dimethylamidocarboxy-phenyl) ester is obtained in the form of coarse, colourless crystals of M.P. 67° C. The yield amounts to 50 g. (83.7% of the theoretical).

*Analysis.*—Calculated for $C_{11}H_{16}O_3NS_2P$ (mol weight 305.4); N, 4.58%; S, 20.99%; P, 10.14%. Found: N, 44.44%; S, 20.53%; P, 10.12%.

Aphids and spider mites are killed 100% by 0.01% solutions of the ester, which also shows an ovicidal action against the eggs of spider mites.

Example 7

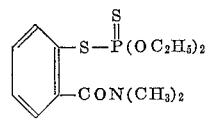

36 g. (0.1 mol) of bis-(2-N,N-dimethylamidocarboxyphenyl)-disulphide are dissolved in 150 cc. of methylene chloride, and 15 g. (0.11 mol) of sulphuryl chloride are added dropwise to this solution at 20° C. A weak exothermic reaction occurs. The temperature of the mixture is maintained at 20 to 25° C. by external cooling. 10 minutes after the addition is completed, the reaction mixture is treated dropwise while stirring with 33 g. (0.22 mol) of O,O-diethyl-thiolphosphorous acid ester, then stirred for a further 10 minutes and finally washed with water and a sodium bicarbonate solution, until the reaction is neutral. After drying the organic phase over sodium sulphate, the solvent is distilled off, and the O,O-diethyl - thionothiolphosphoric acid - S - (2 - N,N - dimethylamidocarboxy-phenyl) ester is obtained in the form of a thickly liquid greenish yellow oil which is not distillable. The yield amounts to 57 g. (86.4% of the theoretical).

*Analysis.*—Calculated for $C_{13}H_{20}O_3NS_2P$ (mol weight 333.4): N, 4.20%; S, 19.23%; P, 9.29%. Found: N, 3.62%; S, 20.06%; P, 9.32%.

On rats per os the acute toxicity of the compound ($DL_{95}$) amounts to 10 mg. per kg. of animal.

Aphids and spider mites are completely kill by 0.01% solutions of the compound. The ester also possesses an ovicidal activity against the eggs of spider mites.

Example 8

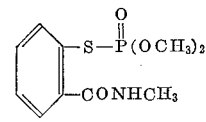

68.5 g. (0.2 mol) of bis-(2-chlorocarboxy-phenyl)-disulphide are suspended in 250 cc. of methylene chloride. 30 g. (0.22 mol) of sulphuryl chloride are added dropwise with stirring to this suspension at 20° C., the reaction mixture is stirred at room temperature for 10 minutes and subsequently treated dropwise at 10 to 20° C., with external cooling, with 55 g. (0.5 mol) of O,O-dimethylphosphorous acid ester. After stirring for a short time, this mixture is added dropwise to 154 cc. of a 27.2% methylamine solution (1.25 mol), the reaction mixture is further stirred for ¼ hour, the organic phase separated and the solvent distilled off. The remaining oil is taken up in benzene, the benzene solution washed with a potassium carbonate solution, the organic layer dried and freed from the solvent. The residual oil solidifies in crystalline form. By recrystallisation from a benzene/petroleum ether mixture, the O,O-dimethyl-thiolphosphoric acid-S-(2-N-methylamidocarboxy-phenyl) ester is obtained in the form of colourless small needles of M.P. 75° C. The yield amounts to 35 g. (31.9% of the theoretical).

*Analysis.*—Calculated for $C_{10}H_{14}O_4NSP$ (mol. weight 275.3): N, 5.08%; S, 11.65%; P, 11.25%. Found: N, 4.96%; S, 11.98%; P, 11.49%.

Aphids and spider mites are killed 100% by 0.001% solutions of the ester, which moreover possesses an ovicidal activity against the eggs of spider mites.

Example 9

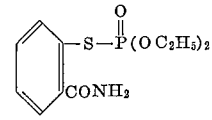

30 g. (0.22 mol) of sulphuryl chloride are added dropwise with stirring at 20° C. to a suspension of 68.5 g. (0.2 mol) of bis-(2-chlorocarboxy-phenyl)-disulphide in 250 cc. of methylene chloride, and then the mixture is stirred at room temperature for 15 minutes. The reaction mixture is subsequently treated at 20 to 25° C., with external cooling, with 70 g. (0.5 mol) of O,O-diethyl-phosphorous acid ester and then added dropwise at 20 to 30° C., with further cooling, to a solution of 110 cc. of concentrated ammonia in 110 cc. of water. The mixture is then further stirred for 1 hour, the methylene chloride layer separated and washed once with water. After drying the organic phase over sodium sulphate, the solvent is distilled off. The residue solidifies in crystalline form. By recrystallising it from a benzene/ether mixture, 100 g. (86.6% of the theoretical yield) of O,O-diethyl-thiolphosphoric acid-S-(2-amidocarboxy-phenyl) ester are obtained in the form of colourless crystals of M.P. 92° C.

*Analysis.*—Calculated for $C_{11}H_{16}O_4NSP$ (mol. weight 289.3): N, 4.84%; S, 11.08%; P, 10.71%. Found: N, 4.89%; S, 10.98%; P, 11.05%.

Aphids and spider mites are completely destroyed by 0.01% solutions of the compound.

Example 10

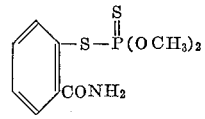

68.5 g. (0.2 mol) of bis-(2-chlorocarboxy-phenyl)-disulphide are suspended with stirring in 250 cc. of methylene chloride, 30 g. (0.22 mol) of sulphuryl chloride are added dropwise to this suspension at 20° C., and stirring is continued at room temperature for 15 minutes. The reaction mixture is then treated at 20 to 25° C., with external cooling, with 63 g. (0.5 mol) of O,O-dimethyl-thiolphosphorous acid ester. This mixture is then added dropwise, with further cooling and stirring, to a solution of 110 cc. of concentrated ammonia in 110 cc. of water, the reaction mixture is further stirred for 1 hour, the methylene chloride layer separated and washed once with water. After drying the organic phase over sodium sulphate, the solvent is distilled off. The residue solidifies in a crystalline form. By recrystallisation from benzene 93 g. (84.6% of the theoretical yield) of O,O-dimethylthionothiolphosphoric acid -S -(2-amidocarboxy-phenyl) ester are obtained in the form of colourless crystals of M.P. 76° C.

Spider mites are completely destroyed by 0.1% solutions, aphids even by 0.01% solutions of the ester.

Example 11

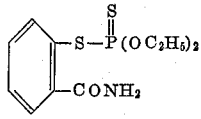

68.5 g. (0.2 mol) of bis-2-chlorocarboxy-phenyl)-disulphide are suspended in 250 cc. of methylene chloride. 30 g. (0.22 mol) of sulphuryl chloride are added dropwise with stirring to this suspension at 20° C., the reaction mixture is stirred for a further 15 minutes at room temperature and finally treated at 20 to 25° C., with external cooling, with 70 g. (0.5 mol) of O,O-diethyl-thiolphosphorous acid ester. This mixture is then added dropwise at 20 to 30° C., with further cooling and stirring to 110 cc. of concentrated ammonia dissolved in 110 cc. of water, the whole is further stirred for 1 hour, the organic phase separated and washed once with water. After drying the methylene chloride solution over sodium sulphate, the solvent is distilled off. The remaining residue solidifies in crystalline form. By recrystallisation from a benzene/petroleum ether mixture the O,O-diethyl-thionothiolphosphoric acid - S-(2-amidocarboxy-phenyl) ester is obtained as a colourless crystalline powder of M.P. 50° C. The yield amounts to 107 g. (87.5% of the theoretical).

*Analysis.*—Calculated for $C_{11}H_{16}O_3NS_2P$ (mol. weight 305.4): N, 4.59%; S, 21.00%; P, 10.14%. Found: N, 4.56%; S, 20.07%; P, 9.85%.

Spider mites are completely destroyed by 0.01% solutions, of the compound, which also shows an ovicidal activity against the eggs of the said pests.

Example 12

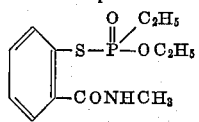

To a suspension of 29 g. (0.0875 mol) of bis-(2-N-methyl-amidocarboxy-phenyl)-disulphide in 100 cc. of chloroform 13 g. (0.096 mol) of sulphuryl chloride are first added dropwise at 20 to 25° C., with stirring and external cooling, and subsequently, after stirring for a short time, 23.4 g. (0.192 mol) of ethyl-thiolphosphonous acid-O-ethyl ester are added at the specified temperature with further cooling. The reaction mixture is further stirred for a short time, the solvent is then distilled off, the residue taken up in benzene and worked up in the manner repeatedly described above. 33 g. (72.2% of the theoretical yield) of the ethyl-thiolphosphonic acid-O-ethyl-S-(2-N-methylamidocarboxyphenyl) ester are obtained in the form of a greenish yellow oil which is not distillable without decomposition, even under strongly reduced pressure.

Mosquito larvae are completely destroyed by 0.001% solutions and grain weevils by 0.1% solutions of the compound.

I claim:
1. A compound of the formula

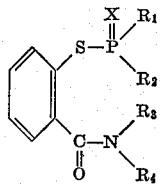

wherein $R_1$ and $R_2$ stand for members selected from the group consisting of lower alkyl having up to 4 carbon atoms and lower alkoxy having up to 4 carbon atoms, $R_3$ and $R_4$ stand for members selected from the group consisting of hydrogen and lower alkyl having up to 4 carbon atoms and X is a chalkogen having an atomic weight less than 40.

2. The compound according to claim 1 wherein $R_1$ and $R_2$ stand for alkoxy, $R_3$ stands for hydrogen and $R_4$ stands for alkyl.

3. The compound according to claim 1 wherein $R_1$ and $R_2$ stand for alkoxy and $R_3$ and $R_4$ stand for alkyl.

4. The compound according to claim 1 wherein $R_1$ and $R_2$ stand for alkoxy and $R_3$ and $R_4$ stand for hydrogen.

5. The compound according to claim 1 wherein $R_1$ stands for alkyl, $R_2$ stands for alkoxy, $R_3$ stands for hydrogen and $R_4$ stands for alkyl.

6. The compound of the formula

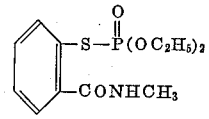

7. The compound of the formula

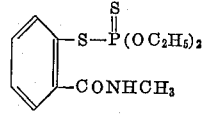

8. The compound of the formula

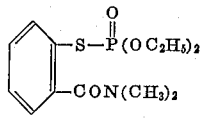

9. The compound of the formula

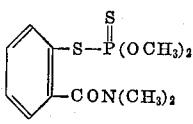

10. The compound of the formula

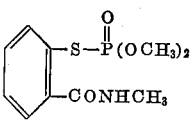

11. The compound of the formula

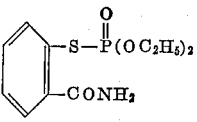

12. The compound of the formula

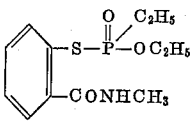

References Cited by the Examiner

UNITED STATES PATENTS

| | | | |
|---|---|---|---|
| 2,915,547 | 12/1959 | Atherton | 260—461 |
| 2,944,074 | 7/1960 | Atherton | 260—461 |
| 3,099,597 | 7/1963 | Chupp et al. | 260—461 X |

FOREIGN PATENTS 1,129,484  5/1962  Germany.

OTHER REFERENCES

Schrader: 615,669, Sept. 28, 1962, Belgium (28 pages spec.; no dwg.) Abstracted in "Chem. Abst.", vol. 58, Col. 11402, May 27, 1963.

CHARLES B. PARKER, *Primary Examiner.*

FRANK M. SIKORA, *Assistant Examiner.*